United States Patent
Duschl et al.

(10) Patent No.: US 9,888,113 B1
(45) Date of Patent: Feb. 6, 2018

(54) MULTI-DIMENSIONAL AUDITORY NOTIFICATION COMPOSITION BASED ON SENDER CATEGORIZATIONS

(71) Applicant: INTERNATIONAL BUSINESS MACHINES CORPORATION, Armonk, NY (US)

(72) Inventors: Heather L. Duschl, Raleigh, NC (US); Alexandra D. Markello, Fayetteville, NC (US); Dana L. Price, Surf City, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/265,876

(22) Filed: Sep. 15, 2016

(51) Int. Cl.
| | |
|---|---|
| *H04M 3/00* | (2006.01) |
| *H04M 1/56* | (2006.01) |
| *H04M 3/42* | (2006.01) |
| *H04M 1/2745* | (2006.01) |
| *H04M 1/57* | (2006.01) |

(52) U.S. Cl.
CPC . *H04M 3/42051* (2013.01); *H04M 1/274508* (2013.01); *H04M 1/274516* (2013.01); *H04M 1/575* (2013.01); *H04M 3/42068* (2013.01)

(58) Field of Classification Search
USPC .......................... 379/142.01, 207.16, 373.02
See application file for complete search history.

(56) References Cited

U.S. PATENT DOCUMENTS

| | | | |
|---|---|---|---|
| 6,944,277 B1* | 9/2005 | Viikki | H04M 19/041 379/142.01 |
| 7,486,785 B2 | 2/2009 | Flores et al. | |
| 7,869,588 B2 | 1/2011 | Fitchmun | |
| 8,014,513 B2 | 9/2011 | LaPierre et al. | |
| 8,463,252 B1 | 6/2013 | Kader | |
| 8,515,037 B2* | 8/2013 | Ye | H04M 3/42017 379/142.06 |
| 8,615,221 B1* | 12/2013 | Cosenza | H04M 3/42 455/414.1 |
| 8,630,671 B2 | 1/2014 | Moody et al. | |
| 8,958,537 B1* | 2/2015 | Saylor | H04M 3/42068 379/142.04 |
| 2002/0009184 A1* | 1/2002 | Shnier | H04M 1/57 379/142.01 |
| 2004/0114733 A1* | 6/2004 | Lawson | H04L 12/66 379/88.18 |
| 2007/0047708 A1 | 3/2007 | Boillot et al. | |

(Continued)

OTHER PUBLICATIONS

Mell et al., "The NIST Definition of Cloud Computing," National Institute of Standards and Technology, Sep. 2011, p. 1-3, Special Publication 800-145.

*Primary Examiner* — Quoc D Tran
(74) *Attorney, Agent, or Firm* — Michael O'Keefe

(57) ABSTRACT

A method for generating a multi-dimensional communication notification for notifying a user is provided. The method may include receiving a plurality of contact details for a contact entry within a contact list. The method may further include determining a plurality of categories associated with the contact entry based on the received plurality of contact details and the identified plurality of supplementary contact details. The method may also include configuring the multi-dimensional communication notification for the contact entry based on the determined plurality of categories.

17 Claims, 5 Drawing Sheets

(56) References Cited

U.S. PATENT DOCUMENTS

| | | |
|---|---|---|
| 2007/0116220 A1 | 5/2007 | Eckel et al. |
| 2007/0127656 A1* | 6/2007 | Citron .................... H04M 1/56 |
| | | 379/142.01 |
| 2007/0129067 A1* | 6/2007 | Summer ................ H04M 3/02 |
| | | 455/414.1 |
| 2007/0165809 A1* | 7/2007 | Nemoto ............. H04M 1/2535 |
| | | 379/142.06 |
| 2010/0293247 A1 | 11/2010 | McKee et al. |

* cited by examiner

MULTI-DIMENSIONAL AUDITORY NOTIFICATION COMPOSITION BASED ON SENDER CATEGORIZATIONS

BACKGROUND

The present invention relates, generally, to the field of computing, and more particularly to communication notifications.

A user device is, generally, a device connected to a network through either a wired or wireless connection that is capable of communicating with other devices. User devices may include laptops, smartphones, tablets, smartwatches, and smart bands. Included within the communication capabilities of user devices may be sending and receiving voice calls, video calls, images, videos, and text messages. When a user device receives a communication, the user device may be capable of producing a notification of the received communication to alert the user, such as a tonal noise or a visual icon displayed on the graphical user interface of the user device.

SUMMARY

According to one embodiment, a method for generating a multi-dimensional communication notification for notifying a user is provided. The method may include receiving a plurality of contact details for a contact entry within a contact list. The method may further include determining a plurality of categories associated with the contact entry based on the received plurality of contact details and the identified plurality of supplementary contact details. The method may also include configuring the multi-dimensional communication notification for the contact entry based on the determined plurality of categories.

According to another embodiment, a computer system for generating a multi-dimensional communication notification for notifying a user is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing a method. The method may include receiving a plurality of contact details for a contact entry within a contact list. The method may further include determining a plurality of categories associated with the contact entry based on the received plurality of contact details and the identified plurality of supplementary contact details. The method may also include configuring the multi-dimensional communication notification for the contact entry based on the determined plurality of categories.

According to yet another embodiment, a computer program product for generating a multi-dimensional communication notification for notifying a user is provided. The computer program product may include one or more computer-readable storage devices and program instructions stored on at least one of the one or more tangible storage devices, the program instructions executable by a processor. The computer program product may include program instructions to receive a plurality of contact details for a contact entry within a contact list. The computer program product may further include program instructions to determine a plurality of categories associated with the contact entry based on the received plurality of contact details and the identified plurality of supplementary contact details. The computer program product may also include program instructions to configure the multi-dimensional communication notification for the contact entry based on the determined plurality of categories.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
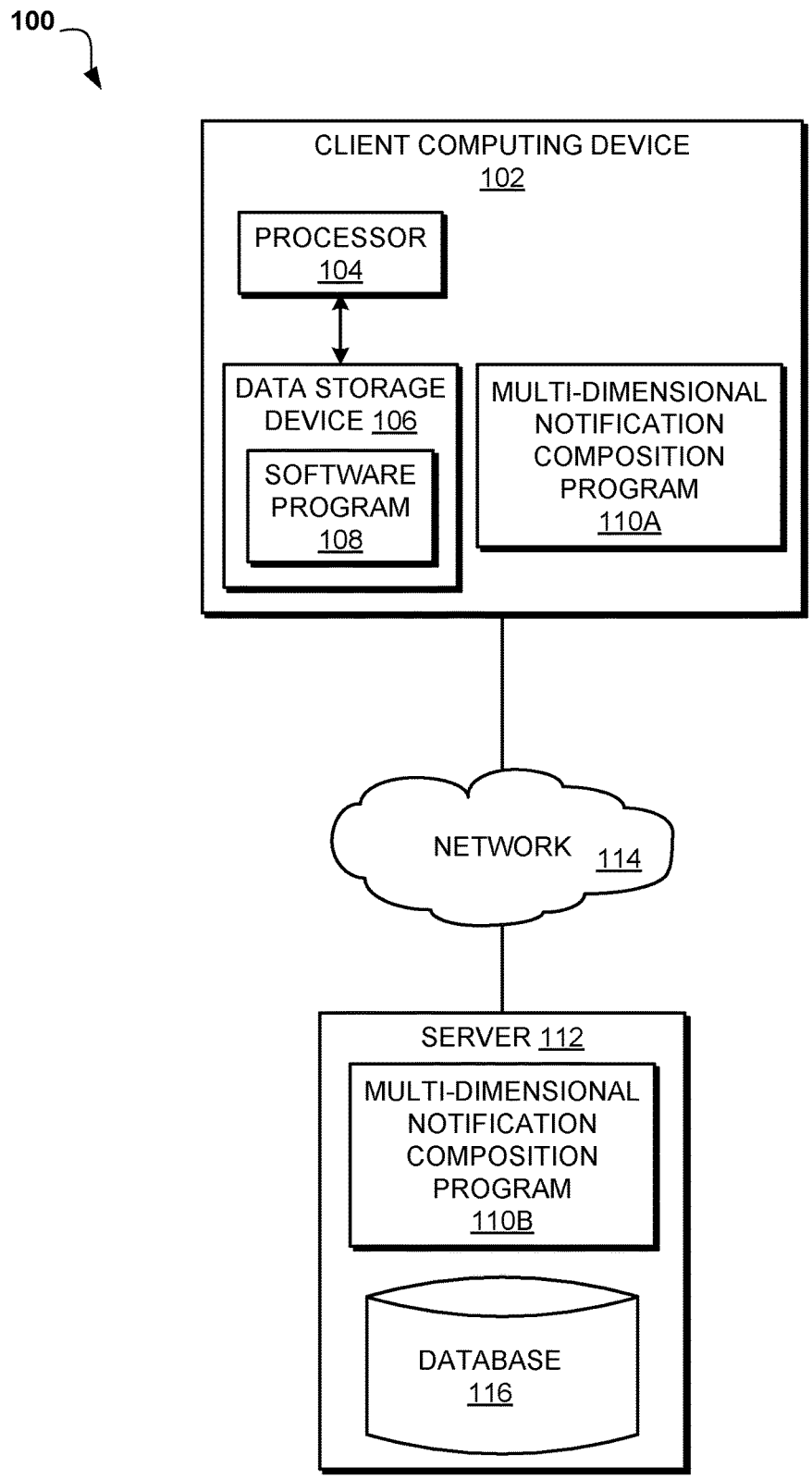
FIG. 1 illustrates an exemplary networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Embodiments of the present invention are related to the field of computing, and more particularly to communication notifications. The following described exemplary embodiments provide a system, method, and program product to, among other things, implement a multi-dimensional notification composition based on a categorization of the caller or message sender. Therefore, the present embodiment has the capacity to improve the technical field of communication notifications by creating a notification that provides some context to the user as to the sender of the call or message without requiring the user to view the user device display screen.

As previously described, a user device is, generally, a device connected to a network through either a wired or wireless connection that is capable of communicating with other devices. User devices may include laptops, smartphones, tablets, smartwatches, and smart bands. Included within the communication capabilities of user devices may be sending and receiving voice calls, video calls, images, videos, and text messages. When a user device receives a communication, the user device may be capable of producing a notification of the received communication to alert the user, such as a tonal noise or a visual icon displayed on the graphical user interface of the user device. However, a user may be required to view the user device display screen to determine the caller or message sender. For example, if a user is working on a ladder when a telephone call is received but the user's smartphone is in another room, the user may need to climb down the ladder and locate the smartphone in order to determine the caller. Depending on the caller's identity, the user may not wish to accept the call but such a determination would not be made until the user has ceased working and taken time to locate the smartphone.

Typically, message notifications may be customized by the user to allow for a unique notification to be assigned to each individual contact stored within a user device. Customizing the notification for each contact may require a great deal of time and effort. Furthermore, due to the potentially large number of contacts within a user contact list, the user may easily forget which unique notification is associated with a specific contact. For example, if a user is woken from a nap by a unique ringtone from the user's smartphone that is across the room, but the user is unable to identify the caller based on the ringtone due to the vast number of unique ringtones the user has assigned to individual contacts, the user may be required to view the smartphone display screen before deciding whether to answer the call. If the caller is important to the user, such as the user's employment supervisor, taking the time to locate the smartphone and view the display screen in order to identify the caller is a prudent use of time. However, if the caller is unimportant to the user, such as a hairdresser calling while the user is completing tax forms, locating the smartphone may be a waste of time to the user. As such, it may be advantageous to, among other things, implement an approach that utilizes information in user contact lists and extended social networks to provide a multi-dimensional, individualized alert notification for each contact without the need for user-customized tones.

According to one embodiment, areas of communication that utilize notifications when a message or call arrives, such as telephone, SMS, multimedia messaging services (MMS), and email, may compose a unique notification based on various factors associated with the caller or sender. The various factors may include gender, relationship to the user, and group affiliation. The various factors may be determined based on user input information as well as information available through the user's social networks. The composed notification may be played when a message or call is received to alert the user of the specific individual sending the message or making the call. The notification may be presented in a variety of types, such as auditory or vibratory, depending on user configuration and device features.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product to compose a unique notification for execution on a user device when a message or call is received based a variety of factors associated with the sender or caller.

Referring to FIG. 1, an exemplary networked computer environment 100 is depicted, according to at least one embodiment. The networked computer environment 100 may include a client computing device 102 and a server 112 interconnected via a communication network 114. According to at least one implementation, the networked computer environment 100 may include a plurality of client computing devices 102 and servers 112, of which only one of each is shown for illustrative brevity.

The communication network 114 may include various types of communication networks, such as a wide area network (WAN), local area network (LAN), a telecommunication network, a wireless network, a public switched network and/or a satellite network. The communication network 114 may include connections, such as wire, wireless communication links, or fiber optic cables. It may be appreciated that FIG. 1 provides only an illustration of one implementation and does not imply any limitations with regard to the environments in which different embodiments may be implemented. Many modifications to the depicted environments may be made based on design and implementation requirements.

The client computing device 102 may include a processor 104 and a data storage device 106 that is enabled to host and run a software program 108 and a multi-dimensional notification composition program 110A and communicate with the server 112 via the communication network 114, in accordance with one embodiment of the invention. The client computing device 102 may be, for example, a mobile device, a telephone, a personal digital assistant, a netbook, a laptop computer, a tablet computer, a desktop computer, or any type of computing device capable of running a program and accessing a network.

The server computer 112 may be a laptop computer, netbook computer, personal computer (PC), a desktop computer, or any programmable electronic device or any network of programmable electronic devices capable of hosting and running a multi-dimensional notification composition program 110B and a database 116 and communicating with the client computing device 102 via the communication network 114, in accordance with embodiments of the invention. The server 112 may also operate in a cloud computing service model, such as Software as a Service (SaaS), Platform as a Service (PaaS), or Infrastructure as a Service (IaaS). The server 112 may also be located in a cloud computing deployment model, such as a private cloud, community cloud, public cloud, or hybrid cloud.

According to the present embodiment, the multi-dimensional notification composition program 110A, 110B may be a program capable of determining factors associated with a message sender or caller, such as gender, group affiliation, and relationship to the user, through external data repositories (e.g. the user's social media networks), explicit user assignments, and/or local data repositories (e.g. user-entered contact list information). The multi-dimensional notification composition program 110A, 110B may create a multi-dimensional notification based on the determined factors. The multi-dimensional notification composition program 110A, 110B may play the notification when a message or call is received from the sender or caller, respectively. The notifications created by the multi-dimensional notification composition program 110A, 110B may be in various formats, such as an audible ringtone or a series of vibrations. The multi-dimensional notification composition method is explained in further detail below with respect to FIG. 2.

Figure 2:
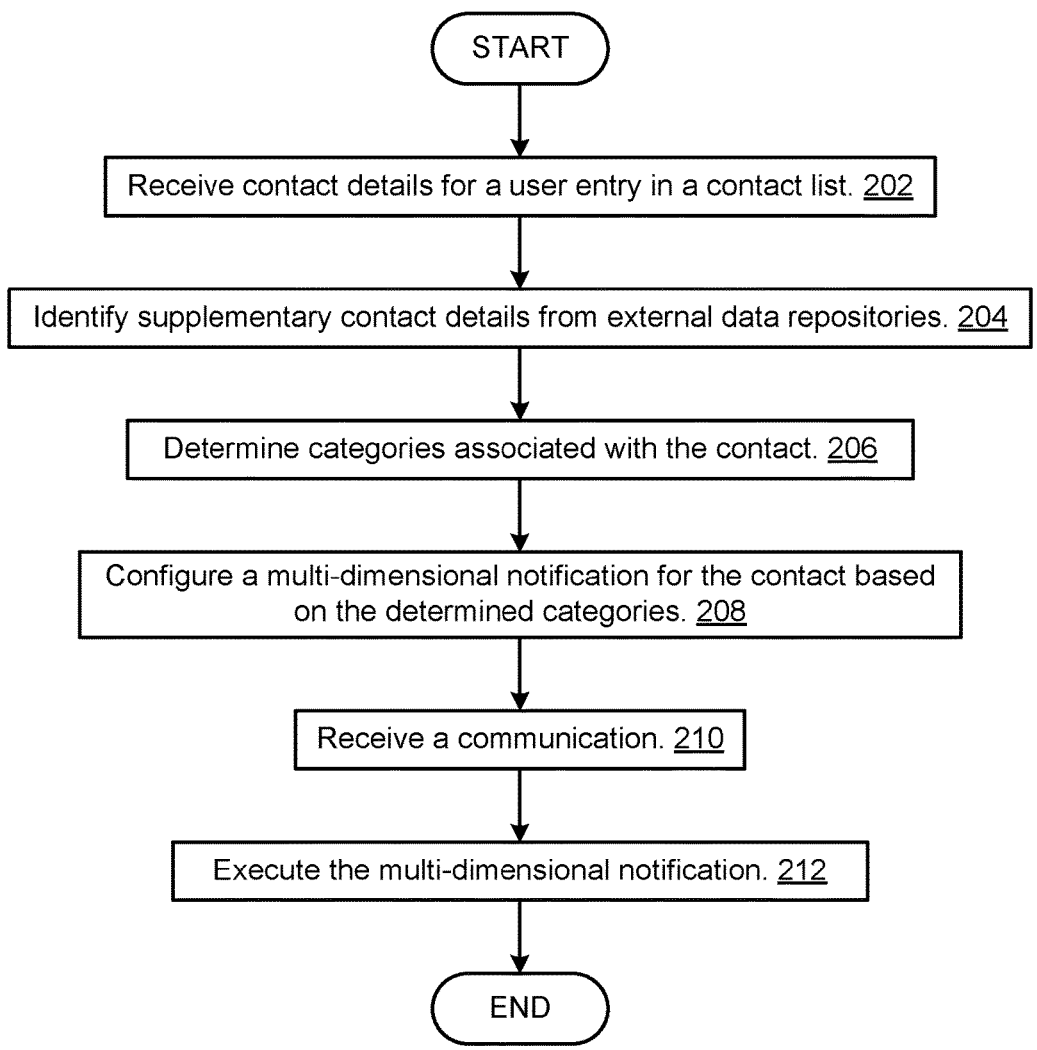
FIG. 2 is an operational flowchart illustrating a multi-dimensional notification composition process according to at least one embodiment.

Referring now to FIG. 2, an operational flowchart illustrating a multi-dimensional notification composition process 200 is depicted, according to at least one embodiment. At 202, the multi-dimensional notification composition program 110A, 110B receives contact details for a contact entry in a contact list. When a user enters contact details for a contact entry, the user typically provides essential information for the creation of the contact entry, such as first name, last name, and at least one telephone number associated with the contact entry. Additional contact information may be included when a user creates a contact entry, such as email address, social networking user name, fax number, SMS number, a contact group, physical address, instant messaging user name, contact nickname, and a phonetic spelling of the contact name. The contact details may be stored within a data repository, such as database 116, or stored within the data storage device 106 within the client computing device 102. Additionally, the multi-dimensional notification composition program 110A, 110B may allow a user to manually designate categories to a specific contact entry within a contact list, such as categories important to a notification that a message is received from a contact entry but that would not typically be part of the contact entry information. The multi-dimensional notification composition program 110A, 110B may store the manually designated categories within the database 116 or within the data storage device 106.

Then, at 204, the multi-dimensional notification composition program 110A, 110B identifies supplementary contact details associated with each contact on the contact list from external data repositories. Utilizing known data mining techniques, the multi-dimensional notification composition program 110A, 110B may obtain additional contact details associated with a contact entry from external data repositories, such as social media networks, public directories, and corporate directories. The supplementary contact details may include information not available to the multi-dimensional notification composition program 110A, 110B within the contact entry, such as contact gender or relationship to the user. Information not available to the multi-dimensional notification composition program 110A, 110B within the contact entry may include contact details for which no field within the contact entry is available, such as gender, and contact details that are unknown to the user. For example, the physical address field may be blank if the user does not know the physical address for the contact.

Next, at 206, the multi-dimensional notification composition program 110A, 110B determines categories associated with the contact entry. Using the contact information (e.g. the received contact details from the contact entry and identified supplementary contact details from the external data repositories), the multi-dimensional notification composition program 110A, 110B may determine categories associated with the contact entry, such as social relationship, gender, and group affiliation. Each field within a category may have a unique, associated indicator. For example, for auditory notifications, the social relationship category may assign a "beep" tone if the contact entry is a friend, a "ding" tone if the contact entry is a work associate, and a "buzz" tone if the social relationship of the contact entry to the user is unknown. In at least one embodiment, the assignment of indicators to each field within a category may be configured by the user. For example, the user may assign a "beep" tone for contact entries that are work associates and a "ding" tone for contact entries that are friends. In another embodiment, the multi-dimensional notification composition program 110A, 110B may allow the user to configure the categories and the fields within each category. For example, rather than the social relationship category including fields for work and friends, the user may configure the multi-dimensional notification composition program 110A, 110B to include fields within the social relationship category of friends and family.

Then, at 208, the multi-dimensional notification composition program 110A, 110B configures a multi-dimensional notification for the contact based on the determined categories. The multi-dimensional notification composition program 110A, 110B may configure the multi-dimensional notification by assigning an indicator associated with the corresponding field for each category consecutively. For example, the multi-dimensional notification composition program 110A, 110B may be configured to produce an auditory tone according to the below settings:

| Gender | Social Relationship | Group Affiliation |
| --- | --- | --- |
| Male = beep | Work = buzz | Soccer team = beep |
| Female = ding | Family = beep | School contact = ding |
| Unknown = buzz | Friend = ding | Unknown = buzz |

If a contact is a female soccer teammate, the multi-dimensional notification composition program 110A, 110B may configure the multi-dimensional tone as "ding-ding-beep" since the contact's gender is female, the contact's social relationship to the user is as a friend, and the contact's group affiliation is the soccer team.

In at least one embodiment, the multi-dimensional notification composition program 110A, 110B may allow the user to configure the order in which indicators are executed. For example, in the previous scenario, the multi-dimensional notification composition program 110A, 110B is configured to play the multi-dimensional tone in the order of gender then social relationship then group affiliation. However, the user may configure the multi-dimensional notification composition program 110A, 110B to execute the tone in the order of social relationship then gender then group affiliation.

Next, at 210, the multi-dimensional notification composition program 110A, 110B receives a communication. The multi-dimensional notification composition program 110A, 110B may monitor the user device (e.g. client computing device) for a communication to be received. As previously described, the received communication may include voice calls, video calls, images, videos, text messages, instant messages, a social media post, an email message, an application-specific message, or any other communication type capable of using a user device.

Then, at 212, the multi-dimensional notification composition program 110A, 110B executes the multi-dimensional notification. The multi-dimensional notification composition program 110A, 110B may identify the individual sending the communication by searching the user's contact list and executing the corresponding multi-dimensional notification. For example, if a text message was received from the female soccer teammate described in the previous example, the multi-dimensional notification composition program 110A, 110B may identify the sender based on the contact entry within the user's contact list and play the previously configured the "ding-ding-beep" multi-dimensional tone associated with the contact entry using the sound system for the user's user device. Additionally, as previously described, depending on user configuration and device features, the notification may be presented in a variety of types, such as auditory sounds, vibrations, or sequential visual displays (e.g. colors, patterns, or images). Furthermore, if information associated with the individual sending the communication is not stored within the user's contact list, the multi-dimensional notification composition program 110A, 110B may execute a default indicator to signify the individual sending the communication is unknown.

It may be appreciated that FIG. 2 provides only an illustration of one implementation and does not imply any limitations with regard to how different embodiments may be implemented. Many modifications to the depicted environments may be made based on design and implementation requirements. For example, the composition of the multi-dimensional notification may be conducted in real time when a message is received by the multi-dimensional notification composition program 110A, 110B rather than being pre-configured prior to the receipt of a message and simply executing the multi-dimensional notification when the message is received.

Additionally, in at least one embodiment, the multi-dimensional notification composition program 110A, 110B may create additional contacts to add to the contact list based on the supplementary contact information retrieved from third party repositories. For example, if a user has a friend on a social media network but not on the contact list stored on the user's smartphone, the multi-dimensional notification composition program 110A, 110B may add information for the social media friend to the contact list based on the available social media information (e.g. phone number and group affiliation). Therefore, the multi-dimensional notification composition program 110A, 110B may be capable of creating a multi-dimensional notification for individuals that would be considered "unknown" based on the user contact list but that have information available on an external data repository.

Figure 3:
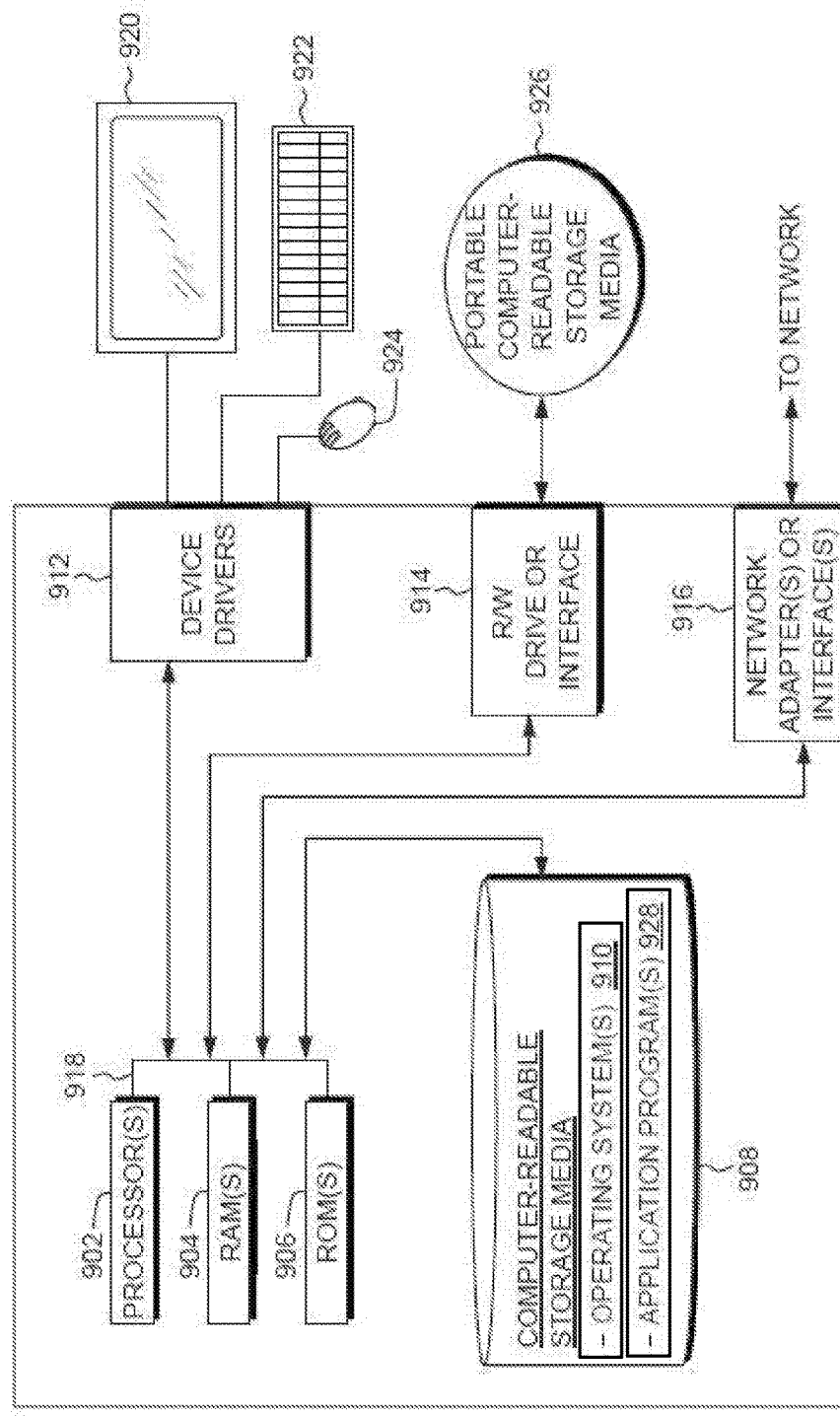
FIG. 3 is a block diagram of internal and external components of computers and servers depicted in FIG. 1 according to at least one embodiment.

FIG. 3 depicts a block diagram of components of a client computing device 102 and/or a server 112 of FIG. 1, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Client computing devices 102 and/or a server 112 may include one or more processors 902, one or more computer-readable RAMs 904, one or more computer-readable ROMs 906, one or more computer readable storage media 908, device drivers 912, read/write drive or interface 914, and network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 928, for example, software program 108, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Client computing devices 102 and/or a server 112 may also include a R/W drive or interface 914 to read from and write to one or more portable computer readable storage media 926. Application programs 928 on client computing devices 102 and/or a server 112 may be stored on one or more of the portable computer readable storage media 926, read via the respective R/W drive or interface 914, and loaded into the respective computer readable storage media 908.

Client computing devices 102 and/or a server 112 may also include a network adapter or interface 916, such as a TCP/IP adapter card or wireless communication adapter (such as a 4G wireless communication adapter using OFDMA technology). Application programs 928 on computing devices 102 and/or a server 112 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

Client computing devices 102 and/or a server 112 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914, and network adapter or interface 916 may comprise hardware and software (stored on computer readable storage media 908 and/or ROM 906).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 4:
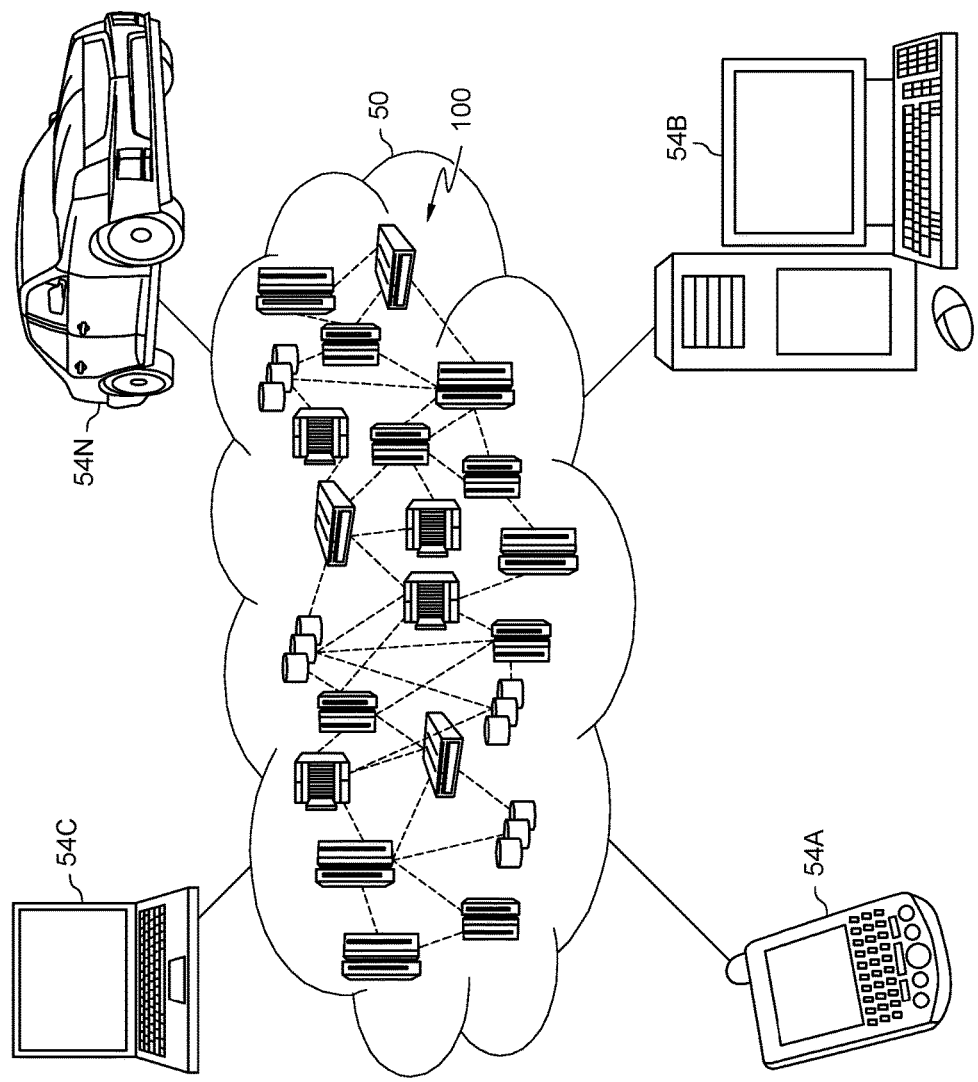
FIG. 4 depicts a cloud computing environment according to an embodiment of the present invention.

Referring now to FIG. 4, illustrative cloud computing environment 50 is depicted. As shown, cloud computing environment 50 comprises one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
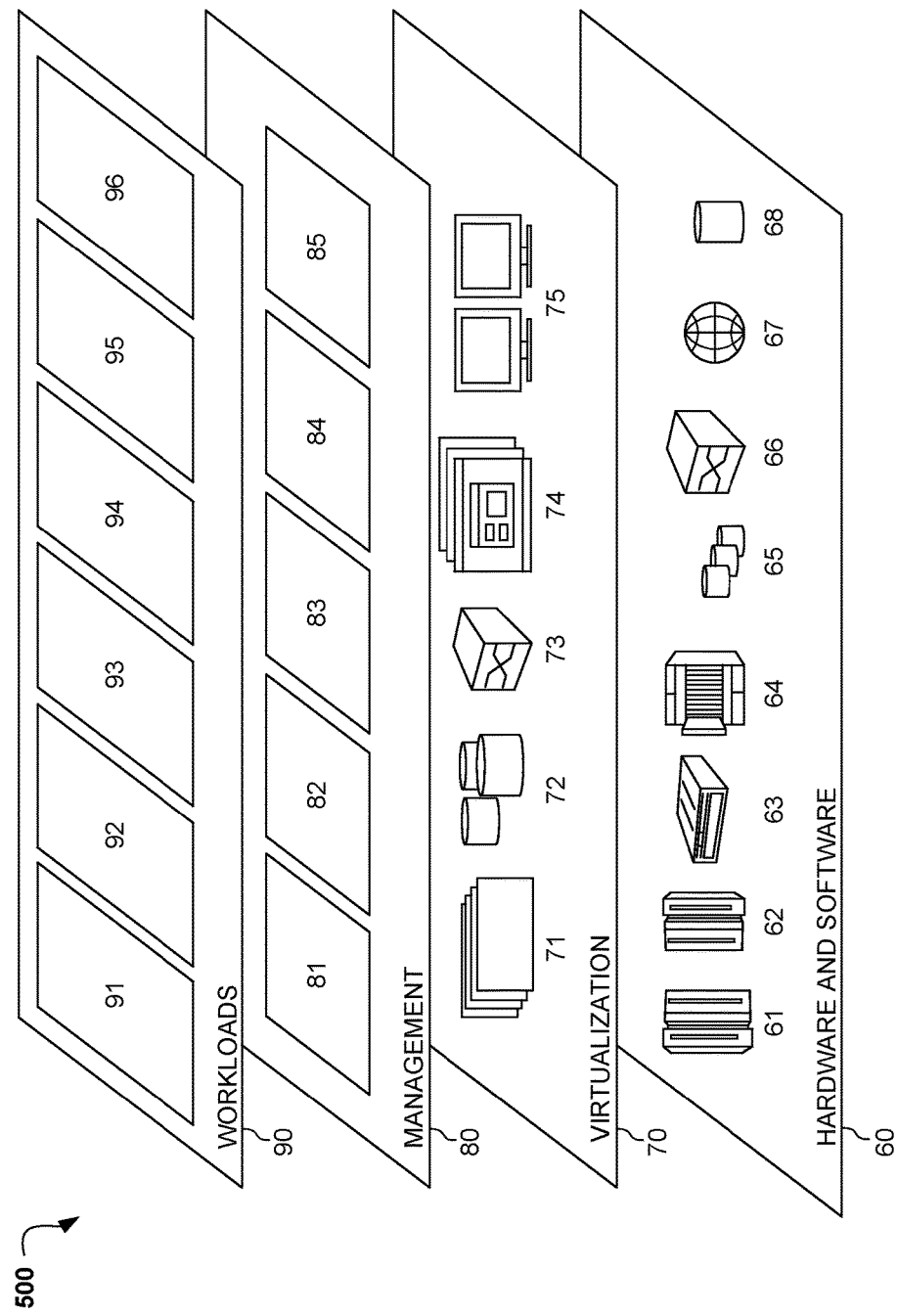
FIG. 5 depicts abstraction model layers according to an embodiment of the present invention.

Referring now to FIG. 5 a set of functional abstraction layers 500 provided by cloud computing environment 50 is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and multi-dimensional notification composition 96. Multi-dimensional notification composition 96 may relate to determining a variety of factors associated with a contact on a user's contact list within a user device and creating a multi-dimensional notification based on the variety of factors to execute when a message or call is received.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A processor-implemented method for generating a multi-dimensional communication notification for notifying a user that does not require a user to manually generate a separate notification for each contact, the method comprising:
receiving, by a processor, a plurality of contact details for a contact entry within a contact list;
determining a plurality of categories associated with the contact entry based on the received plurality of contact details and the identified plurality of supplementary contact details; and
configuring the multi-dimensional communication notification for the contact entry based on the determined plurality of categories, wherein the configured multi-dimensional communication notification is a plurality of alerts executed in a consecutive order, and wherein the alerts are selected from a group consisting of one or more auditory sounds, one or more vibrations, and one or more visual displays of a user device.

2. The method of claim 1, wherein configuring the multi-dimensional communication notification further comprises:
assigning an indicator to the contact entry based on at least one field of information for the contact entry within each category within the determined plurality of categories.

3. The method of claim 1, further comprising:
identifying a plurality of supplementary contact details from at least one external data repository, wherein the at least one external data repository is selected from a group consisting of a social media network, a public directory, and a corporate directory.

4. The method of claim 1, further comprising:
receiving a communication from a sender device and composed by a sender associated with the contact entry; and
executing the configured multi-dimensional notification by a user device.

5. The method of claim 1, wherein the plurality of contact details is selected from a group consisting of an email address, a social networking user name, a fax number, a short messaging service number, a contact group, a physical address, an instant messaging user name, a contact nickname, and a contact name phonetic spelling.

6. The method of claim 4, wherein the received communication is selected from a group consisting of a voice call, a video call, an image, a video, a text message, an instant message, a social media post, an email, and an application-specific communication.

7. A computer system for generating a multi-dimensional communication notification for notifying a user that does not require a user to manually generate a separate notification for each contact, the computer system comprising:
one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
receiving a plurality of contact details for a contact entry within a contact list;
determining a plurality of categories associated with the contact entry based on the received plurality of contact details and the identified plurality of supplementary contact details; and
configuring the multi-dimensional communication notification for the contact entry based on the determined plurality of categories, wherein the configured multi-dimensional communication notification is a plurality of alerts executed in a consecutive order, and wherein the alerts are selected from a group consisting of one or more auditory sounds, one or more vibrations, and one or more visual displays of a user device.

8. The computer system of claim 7, wherein configuring the multi-dimensional communication notification further comprises:
assigning an indicator to the contact entry based on at least one field of information for the contact entry within each category within the determined plurality of categories.

9. The computer system of claim 7, further comprising:
identifying a plurality of supplementary contact details from at least one external data repository, wherein the at least one external data repository is selected from a group consisting of a social media network, a public directory, and a corporate directory.

10. The computer system of claim 7, further comprising:
receiving a communication from a sender device and composed by a sender associated with the contact entry; and
executing the configured multi-dimensional notification by a user device.

11. The computer system of claim 7, wherein the plurality of contact details is selected from a group consisting of an email address, a social networking user name, a fax number, a short messaging service number, a contact group, a physical address, an instant messaging user name, a contact nickname, and a contact name phonetic spelling.

12. The computer system of claim 10, wherein the received communication is selected from a group consisting of a voice call, a video call, an image, a video, a text message, an instant message, a social media post, an email, and an application-specific communication.

13. A computer program product for generating a multi-dimensional communication notification for notifying a user that does not require a user to manually generate a separate notification for each contact, the computer program product comprising:
one or more computer-readable non-transitory tangible storage media and program instructions stored on at least one of the one or more non-transitory tangible storage media, the program instructions executable by a processor, the program instructions comprising:
program instructions to receive a plurality of contact details for a contact entry within a contact list;
program instructions to determine a plurality of categories associated with the contact entry based on the received plurality of contact details and the identified plurality of supplementary contact details; and
program instructions to configure the multi-dimensional communication notification for the contact entry based on the determined plurality of categories, wherein the configured multi-dimensional communication notification is a plurality of alerts executed in a consecutive order, and wherein the alerts are selected from a group consisting of one or more auditory sounds, one or more vibrations, and one or more visual displays of a user device.

14. The computer program product of claim 13, wherein configuring the multi-dimensional communication notification further comprises:
    program instructions to assign an indicator to the contact entry based on at least one field of information for the contact entry within each category within the determined plurality of categories.

15. The computer program product of claim 13, further comprising:
    program instructions to identify a plurality of supplementary contact details from at least one external data repository, wherein the at least one external data repository is selected from a group consisting of a social media network, a public directory, and a corporate directory.

16. The computer program product of claim 13, further comprising:
    program instructions to receive a communication from a sender device and composed by a sender associated with the contact entry; and
    program instructions to execute the configured multi-dimensional notification by a user device.

17. The computer program product of claim 13, wherein the plurality of contact details is selected from a group consisting of an email address, a social networking user name, a fax number, a short messaging service number, a contact group, a physical address, an instant messaging user name, a contact nickname, and a contact name phonetic spelling.

* * * * *